United States Patent [19]

Kim et al.

[11] Patent Number: 5,352,728
[45] Date of Patent: Oct. 4, 1994

[54] PROCESS FOR PREPARATION OF IMPACT RESISTANCE AND HIGH GLOSS THERMOPLASTIC RESIN

[75] Inventors: Dong R. Kim; Chan H. Lee, both of Daejeon-si, Rep. of Korea

[73] Assignee: Lucky, Ltd., Seoul, Rep. of Korea

[21] Appl. No.: 71,045

[22] PCT Filed: Feb. 28, 1991

[86] PCT No.: PCT/KR91/00006

§ 371 Date: Dec. 30, 1991

§ 102(e) Date: Dec. 30, 1991

[87] PCT Pub. No.: WO91/13118

PCT Pub. Date: Sep. 5, 1991

Related U.S. Application Data

[63] Continuation of Ser. No. 768,323, Dec. 30, 1991, abandoned.

[30] Foreign Application Priority Data

Feb. 28, 1990 [KR] Rep. of Korea .................. 90-2664

[51] Int. Cl.$^5$ ................................................ C08J 3/02
[52] U.S. Cl. ...................................... 524/501; 525/71
[58] Field of Search .......................... 524/501; 525/71

[56] References Cited

U.S. PATENT DOCUMENTS 4,753,988  6/1988  Henton et al. ...................... 525/75

Primary Examiner—Joseph L. Schofer
Assistant Examiner—Peter D. Mulcahy
Attorney, Agent, or Firm—Birch, Stewart, Kolasch & Birch

[57] ABSTRACT

The present invention relates to a process for the preparation of impact resistant and high gloss thermoplastic resin which comprises blending graft polymer latex (A) and graft polymer latex (B), wherein the graft polymer (A) having 40,000 to 120,000 of molecular weight and 60 to 120 % of the degree of grafting is produced by grafting monomers onto 10 to 40 parts by weight of rubber latices containing small rubber particles, and then the graft polymer (B) having 40,000 to 120,000 of molecular weight and 25 to 45 % of the degree of grafting is produced by grafting monomers onto 40 to 80 parts by weight of rubber latices containing large rubber particles.

14 Claims, No Drawings

PROCESS FOR PREPARATION OF IMPACT RESISTANCE AND HIGH GLOSS THERMOPLASTIC RESIN

This application is a continuation, of application Ser. No. 07/768,323 filed on Dec. 30, 1991, now abandoned.

BACKGROUND OF THE INVENTION

1. Field of the Invention

The present invention relates to a process for the preparation of impact resistant and high gloss thermoplastic resin. More particularly, it relates to a process for the preparation of thermoplastic resin which is improved in both impact resistance and surface gloss by using rubber latices having a high percentage of gel content and different rubber particle diameters.

2. Description of the Related Arts

Up to date, it has been well known that a good processible and impact resistant thermoplastic resin may be produced by means of grafting a mixture of vinyl aromatic monomers such as styrene, $\alpha$-methyl styrene, etc. and other monomers, which can be copolymerized with it, into a rubber modified resin.

The rubber latex must contain a low percentage of gel content in order to produce a good impact resistant thermoplastic resin. However, the thermoplastic resin containing low gel content rubber particles has a drawback of poor surface gloss. On the other hand, when the rubber latex contains a high percentage of gel content in order to improve surface gloss, the impact strength is lowered. Also, the amount of small particles in the resin may be increased in order to improve a surface gloss. However, this method has drawbacks in that the impact strength and the melt flow rate of the thermoplastic resin are lowered.

Accordingly, it is necessary to provide a process for the preparation of the thermoplastic resin of which both impact resistence and high gloss are improved.

The present inventors investigated a process assiduously to improve the above-mentioned problems.

SUMMARY OF THE INVENTION

The object of the present invention is to provide a process for the preparation of a thermoplastic resin which is improved in both impact resistance and surface gloss by using rubber latices having a high percentage of gel content and different rubber particle diameters.

DETAILED DESCRIPTION OF THE INVENTION

The present invention is a process for the preparation of impact resistant and high gloss thermoplastic resin, which comprises blending graft polymer latex (A) and graft polymer latex (B), wherein the graft polymer (A) having 40,000 to 120,000 of weight average molecular weight, Mw, and 60 to 120% of the degree of grafting is produced by grafting a mixture of monomers onto 10 to 40 parts by weight of rubber latices which contain small particles, and wherein the graft polymer latex (B) having 40,000 to 120,000 of weight average molecular weight, Mw, and 25 to 45% of the degree of grafting is produced by grafting a mixture of monomers onto 40 to 80 parts by weight of rubber latices which contain large particles.

In more detail, for the first step, 60 to 90 parts by weight of the mixture of monomers are grafted onto 10 to 40 parts by weight (solid base) of rubber latices containing small particles, wherein the amount of gel content in the rubber latices is 70 to 95% by weight and the average particle diameter is 0.03 to 0.02 $\mu$m. The weight parts of the rubber latices are based on the solid content.

In the second step, the rubber latices which contain large particles having a diameter of 0.25 to 1.0 $\mu$m, is produced by agglomerating the rubber latices containing small particles used in the first step. The degree of grafting of the graft polymer (B) is 25 to 45%, and the molecular weight of the grafted polymer is 40,000 to 120,000.

Next, in the third step, the final product is produced by blending the two kinds of rubber latices which differ in both particle diameter and degree of grafting, wherein the ratio of large particles to small particles in a total rubber content is 95/5 to 70/30 by weight. The rubber content in the final product is 35 to 55% by weight.

The mixture of monomers used in this present invention include vinyl aromatic monomers, or one or more than two of the other vinyl monomers which can be copolymerized with them. The examples of the former are styrene, $\alpha$-methylstyrene, halostyrenes such as o-chlorostyrene or p-chlorostyrene, dibromostyrene, tribromostyrene. Also, the latter, e.g., one or more than two of the other vinyl monomers are vinyl cyanic monomers such as acrylonitrile and methacrylonitrile, unsaturated carboxylic acid such as acrylic acid and methacrylic acid, and lower esters thereof, for example, methacrylate, butylacrylate and methylmethacrylate.

Also, the rubber particles used in the present invention are polybutadiene and butadiene copolymer having more than 50% by weight of butadiene, and Examples of monomer copolymerizable with butadiene are vinyl aromatic monomers such as styrene, $\alpha$-methyl styrene and vinyl toluene, unsaturated carboxylic acid and the corresponding esters thereof such as acrylic acid, methacrylic acid and methyl, ethyl, propyl, n-butyl and iso-butyl, vinyl cyanic compounds such as acrylonitrile. In addition, polyisoprene, polychloroprene, and ethylene-propylene-diene terpolymer, are also suitable.

A process for the preparation of the above-mentioned rubber latices containing small particles according to the first step is as follows.

In 18m$^3$-reactor having agitator, heater and other necessary equipment, 100 parts by weight of 1,3-butadiene, 0.2 parts by weight of t-dodecyl mercaptan, 0.3 parts by weight of potassium persulfate, 2.2 parts by weight of potassium salt of fatty acid and 120 parts by weight of deionized water are reacted for 17 hours at 63° C. When the conversion is 95%, the reaction is completed by adding prohibitor to the reactor.

The average particle diameter of the above-mentioned rubber latex is 0.03 to 0.2 $\mu$m, more preferably, 0.05 to 0.15 $\mu$m. The amount of gel contained in the rubber latex is preferably 70 to 95% by weight, more desirably, more than 85% by weight. If the above amount is more than 95% by weight, impact strength of the produced resin is poor.

The gel content of the rubber latices containing small particles is measured according to the following formula (I). The rubber latex is coagulated, and the coagulated crumb is washed. After washing, the crumb is dried in a vacuum oven at 45° C. for a day. Next, 1 g of the polymer are added to 100 g of toluene. It is left for 48 hours and then the amount of dissolved parts and that of indissolved parts are measured.

$$\text{The amount of gel}(\%) = \frac{\text{the weight of indissolved parts}}{\text{the weight of sample}} \times 100 \quad (I)$$

In order to control the amount of gel, 0.01 to 2.0 parts by weight of cross linking agent are added to the polymerization system, or it is adjusted to be 90 to 95% of the conversion. The usable cross linking agent is divinylbenzene, diallylmaleate, diallylfumarate, allylacrylate, polyhydric alcohol, ethyleneglycol dimethacrylate and etc..

The above obtained rubber latices containing small particles is grafted by the mixture of monomers to obtain graft polymer. The graft polymerization is carried out according to general emulsion polymerization method.

That is, 60 to 90 parts by weight of the mixture of monomers are added to 10 to 40 parts by weight of the above-mentioned rubber latices containing small particles at 38° to 85° C., and the reaction mixture is polymerized according to the general emulsion polymerization method to obtain graft polymer. If the reaction temperature is more than 85° C., the degree of whiteness of the graft polymer is decreased.

The adding process of monomers is divided in two steps, in the first step, 4/9 to 1/6 by weight of the whole quantity of monomers together with emulsifier and initiator are added to 10 to 40 parts by weight of rubber latices, and then the first reaction step is completed by increasing the reaction temperature from 38° C. to 70° C.

In the second step, the remaining monomers and emulsifier are mixed to obtain emulsion (mixed monomer solution). The emulsion is added to the above mentioned reaction system for 3 hours continuously at 70° to 85° C. Since the impact resistance and surface gloss of the final product is affected by the amount of chain transfer agent, it is desirable to adjust the amount of molecular weight controller. The amount of molecular weight controller (chain transfer agent) is preferably 0.3 to 1.5 parts by weight per 100 parts by weight of monomer in order to achieve the object of the present invention. When the conversion of this reaction is above 99%, the solid content is about 40% by weight.

As the emulsifier, alkaline metal salt of fatty acid, sulfuric ester of fatty acid, alkaline metal salt of heterogeneous rosinic acid and conventional emulsifiers generally used in the emulsion polymerization can be used.

The initiator is preferably the water soluble type or the redox type, such as organic hydroperoxide-iron salt. The utilized molecular weight controller is preferably mercaptans, terpenes and halides.

The above-mentioned emulsifier, initiator and molecular weight controller may be added to the polymerization system in a batchwise, stepwise or continuous fashion. However, it is desirable to add them continuously for a certain time in view of reproducibility.

The above graft polymer is coagulated with 5%-sulfuric acid to obtain white powder, and then the powder is dissoved in acetone. The degree of grafting according to the following formula (II) is measured.

$$\text{the degree of grafting} = \frac{\text{the weight of polymer grafted onto rubber}}{\text{the weight of rubber}} \times 100 \quad (II)$$

The degree of grafting of the rubber latices containing small particles must be 60 to 120% so as to correspond to the object of this invention. If the degree of grafting is less than the above specified value, physical properties of the produced polymer are very poor because the dispersion of the rubber particles is poor. Also, surface gloss will not be improved.

The weight average molecular weight of grafted polymer is preferably 40,000 to 120,000, more preferably, 50,000 to 100,000 (molecular weight is measured by G.P.C. [Gel Permeation Chromatography]). If the molecular weight is more than 120,000, impact resistance is good but processibility and surface gloss are poor. Oppositely, if the molecular weight is less than 40,000, surface gloss is good but the impact strength is rapidly lowered.

Accordingly, the rubber latices containing small particles of which the degree of grafting preferably 60 to 120%, more preferably, 65 to 100%, and the weight average molecular weight of grafted chain is desirably 50,000 to 100,000 in order that we would obtain the desirable graft polymer.

Next, the rubber latices containing large rubber particles are used. They are produced by agglomerating the rubber latices containing small particles. In this case, it are necessary to increase the average rubber particle diameter in order that the thermoplastic resin has improved impact resistance.

Generally, average rubber particle diameter and gel content in the rubber particle are key parameters affecting the mechanical strength and other physical properties. The gel content of the large particles is desirably 60 to 80% by weight. In order to make rubber latices containing large particles of which average diameter is 0.25 to 1.0 μm, it takes a long reaction time and undesirable coagulum is abundantly produced in reactor. Accordingly, in this invention the rubber latices containing large particles of which average particle diameter is 0.25 to 0.50 μm are made by an agglomeration technique using acetic acid.

That is, to reactor 238 parts by weight of rubber latices having 0.08 μm of average particle diameter (containing 42% by weight of solid) is added at 30° C. at 10 rpm, and 35 parts by weight of 7% acetic acid solution is added to the reactor for 1 hour slowly, and then agitation is stopped and it is left for 30 minutes. Next, 27 parts by weight of the solution of potassium hydroxide is added for 30 minutes to obtain agglomerated rubber latices containing 0.32 μm of particle diameter. The solid content in the agglomerated rubber latex is about 31% by weight and pH is about 10, the gel content of the latex is 85 to 95% by weight. In order to make an impact resistant thermoplastic resin using the above latex having a higher gel content of 85 to 95%, the following step is very important.

Generally, since the degree of expansion of the rubber latex having a low percentage of gel is in grafted polymerization much higher than that of the rubber latex having a high percentage of gel, the rubber latex having a low percentage of gel is used in producing an impact resistant resin. Monomers is abundantly polymerized inside of the rubber particle, which increase the effective volume of the rubber. As the result, the impact strength is improved. In the present invention a polymerizing condition is set up according to the abovementioned fact in order that the rubber latex having a high percentage of gel may maintain the high degree of expansion during the graft polymerization.

In the early reaction stage, it is very important to control the amount of rubber latex and that of monomer in order to maintain a higher expansion rate of the rubber particle. Besides, the reaction temperature, adding speed of monomers, the amount of molecular weight controller and adding time thereof must be controlled.

The method of adding monomers to rubber latices containing large particles is divided in two types.

The first type is the method of adding monomers in a continuous way.

Namely, 50 to 80% by weight of monomers are added to 40 to 80 parts by weight of rubber latex at 42° to 72° C. for 3 hours, and then the remaining monomers and the molecular weight controller are added to the reactor for 1.5 hours at 70° to 80° C. After the monomers are added, the reaction is carried out for 1 hour. The amount of molecular weight controller is preferably 0.3 to 1.5 parts by weight, more desirably, 0.4 to 1.3 parts by weight per 100 parts by weight of monomers.

The second method is as follows. The monomers are added to the reactor by two steps. The first step is a batchwise addition of the monomers to the reactor, and the remaining monomers are added to the reactor continuously. Namely, monomers and 0.3 to 1.5 parts by weight, more desirably, 0.6 to 1.3 parts by weight of molecular weight controller per 100 parts by weight of monomers are added batchwise to the rubber latex, in which the ratio of monomer/rubber is 0.16 to 0.35 by weight, more desirably, 0.17 to 0.30 by weight. The reaction temperature is maintained at 42° to 62° C. until the degree of conversion reaches 65%. When the conversion is above 65%, the reaction temperature is raised to 68° C. Next, when the degree of conversion comes to 95%, the remaining monomers and initiator are added intermittently for 3 hours. After completion of the reaction, it is aged for 1 hour. The final degree of conversion is about 97 to 98%. Next, the reaction temperature is decreased by 50° C., and then it is transferred to the storage tank. The degree of grafting and molecular weight of the grafted chain are measured. The degree of grafting is preferably 25 to 45%, more preferably, 35 to 45%, and the weight average molecular weight is preferably 40,000 to 120,000, more preferably, 45,000 to 100,000.

Graft Polymer latices differing in the degree of grafting and particle diameter are blended suitably to produce a thermoplastic resin having excellent impact resistance and surface gloss. If the amount of graft polymer latex which has large particles and low degree of grafting is increased, the impact resistance are well. Oppositely, if the amount of graft polymer latices which has small particle diameter and high degree of grafting is increased, surface gloss is good. Therefore, the present invention has an advantage that the ratio of reactants can be adjusted according to the use of final product.

The more detailed description of the present invention according to Examples is as follows.

EXAMPLE 1

(1) the preparation of the rubber latices containing small rubber particles 2142.9 kg of polybutadiene latex of which average particle diameter is 0.08 μm and the amount of gel is 92% by weight (solid 42% by weight) are added to the reactor, and then 2535.3 kg of deionized water and 192 kg of potassium rosinate (solid 25% by weight) as an emulsifier are added to the reactor. After it was agitated, 1470 kg of styrene, 630 kg of acrylonitrile, 21 kg of t-dodecyl mercaptan and 1917.6 kg of deionized water are added to the reaction system at 30° C. The temperature of inside of the reactor was increased to 35° C., and then 600 kg of deionzed water, 15 kg of tetrasodium pyrophosphate, 16.8 kg of dextrose, 0.27 kg of ferrous sulfate heptahydrate are added to the reactor. The reaction temperature is increased by 38° C., and the heating is stopped. Next, 9 kg of cumene hydroperoxide (CHP) as an initiator are added. 30 minutes later, the temperature of inside of the reactor is increased to 80° C. by the reaction. The temperature of reactor is cooled to 70° C. for 30 minutes, and then the emulsion consisting of 2761.2 kg of deionized water, 240 kg of potassium rosinate, 2100 kg of styrene, 900 kg of acrylonitrile and 30 kg of t-dodecyl mercaptan are added to the reaction system intermittently for 3 hours. At the same time, 11.4 kg of cumene hydroperoxide as an initiator are added to the reactor continuously for 3 hours. Next, aged for 1 hour, the mixture is transfered to the storage tank. The obtained latex comprises 39% by weight of solid.

(2) the preparation of the rubber latices containing large rubber particles 11764.8 kg of polybutadiene latex of which average particle diameter is 0.32 μm and the amount of gel is 92% by weight (solid 31% by weight) are added to the reactor, and then 522 kg of deionized water and 29.5 kg of potassium rosinate (solid 25% by weight) as an emulsifier are added to the reactor. After agitated, 630 kg of styrene, 270 kg of acrylonitrile, 6.78 kg of t-dodecyl mercaptan as a molecular weight controller are added to the reaction system at 25° C. Then the temperature of reactor was increased to 40° C., and then 600 kg of deionized water, 15 kg of tetrasodium pyrophosphate, 16.8 kg of dextrose, 0.27 kg of ferrous sulfate heptahydrate are added to the reactor, and the reaction temperature is increased by 42° C. Next, 6 kg of cumene hydroperoxide (CHP) as an initiator are added. When the temperature of reactor is increased to 62° C. for 1 hour, the degree of conversion comes to 65%. When the temperature of reactor is increased to 68° C. again, the degree of conversion comes to 95%. At this moment, the 9 kg of cumene hydroperoxide as an initiator and emulsion consisting of 1074 kg of deionized water, 144 kg of potassium rosinate, 1050 kg of styrene, 450 kg of acrylonitrile and 11.3 kg of t-dodecyl mercaptan are added to the reaction system under maintaining 72° C. of temperature for 3 hours. Next, after the mixture is aged for 1 hour, the reaction is completed. The obtained latex comprises 36.2% by weight of solid, and the degree of conversion is 98%.

(3) the preparation of a ABS graft polymer by latex blending

The graft polymer latices obtained in the above-mentioned process (1) and process (2) are mixed in the ratio of 1:2 by weight, and then the mixed latices are agitated. This ABS latex has 45% by weight of rubber. The latex is coagulated with 5%-sulfuric acid to obtain powder. In the obtained resin, the ratio of the amount of the small rubber particles to the amount of the large rubber particles is 11.11:88.89 by weight.

(4) blending process of matrix resin and ABS powder 675 g of ABS powder obtained in the above-mentioned process (3) and 1,575 g of SAN-1 copolymer compatible with ABS powder are mixed and diluted, and then it is moulded to obtain samples for measuring physical properties. The amount of rubber contained in samples is 13.5% by weight. The degree of grafting and molecular weight of the sample are represented in Table 1.

EXAMPLE 2-1 and 2-2.

(1) the preparation of the rubber latices containing small rubber particles 1428.6 kg of polybutadiene latex used in Example 1 are added to reactor, and then 2949.6 kg of deionized water and 192 kg of potassium rosinate as an emulsifier are added to the reactor. After agitated, 1680 kg of styrene, 720 kg of acrylonitrile, 24 kg of t-dodecyl mercaptan and 1917.6 kg of deionized water are added to the reaction system. The temperature of reactor was increased to 35° C., and then 600 kg of deionized water, 15 kg of tetrasodium pyrophosphate, 16.8 kg of dextrose, 0.27 kg of ferrous sulfate heptahydrate are added, and the reaction temperature is increased by 38° C. After that, the heating is stopped. Next, 9 kg of cumene hydroperoxide(CHP) as an initiator are added. After 30 minutes the temperature of the reactor is increased to 83° C. by the exothermic reaction. The temperature of the reactor is decreased to 70° C. for 30 minutes. The remaining emulsions of monomer mixtures are added to the reaction system intermittently for 3 hours. The amount and the composition of the emulsion are equal to the Example 1.

(2) the preparation of the rubber latices containing large particles

This process followed the procedure of the process (2) of Example 1.

(3) the preparation of a ABS graft polymer by latex blending (Example 2-1)

The graft polymer latices obtained in the above-mentioned process (1) and (2) are mixed in the ratio of 1:1 by weight, and then the mixed latices are agitated. This ABS latex has 35% by weight of rubber. This latex is coagulated as the process (3) of Example 1 to obtain the ABS powder.

(4) blending process of matrix resin and ABS powder (Example 2-1)

857.2 g of the ABS powder obtained in the above-mentioned process (3) and 1142.8 g of SAN-1 copolymer compatible with ABS powder are mixed, and then it is moulded to obtain samples for measuring physical properties. The amount of rubber contained in the sample is 15% by weight. The degree of grafting and molecular weight of the sample are presented in Example 2-1 of Table 1.

(5) the preparation of a ABS graft palymer by latex blending (Example 2-2)

The graft polymer latices obtained in the above-mentioned process (1) and (2) are mixed in the ratio of 2:3 by weight, and then the mixed latices are agitated. This ABS latex has 40% by weight of rubber. This latex is coagulated as the process(3) of Example 1 to obtain the ABS powder.

(6) blending process of matrix resin and ABS powder (Example 2-2)

The ABS powder obtained in the above-mentioned process (5) and SAN-1 copolymer compatible with the ABS powder are mixed, and then it is moulded to obtain samples for measuring physical properties. The amount of rubber contained in the sample is 15% by weight. The degree of grafting and molecular weight of the product are presented in Example 2-2 of Table 1.

EXAMPLE 3

(1) the preparation of the rubber latices containing small rubber particles

The present process followed the procedure of the process(1) of Example 1. The rubber content of the obtained latex is 15% by weight.

(2) the preparation of the rubber latices containing large rubber particles 12580.6 kg of polybutadiene latex of which average particle diameter is 0.32 $\mu$m and the amount of gel is 92% by weight (solid 31% by weight) are added to the reactor, and then 607.3 kg of deionized water are added. The reaction temperature is increased by 40° C. Next, as activators, 501.18 kg of deionized water, 10.51 kg of tetrasodium pyrophosphate, 13.2 kg of dextrose, 0.21 kg of ferrous sulfate heptahydrate are added, and the reaction temperature is increased by 42° C. Next, 9.75 kg of cumene hydroperoxide (CHP) as an initiator are added to the reactor continuously for 4 hours. At the same time, the emulsion of monomers is added for 4 hours. 75% by weight of the emulsion consisting of 601.2 kg deionized water, 189 kg of potassium rosinate, 1470 kg of styrene, 630 kg of acrylonitrile and 18 kg of t-dodecyl mercaptan are added to the reaction system for 3 hours. The reaction temperature is increased from 42° C. to 70° C., and then remaining 25% by weight of the emulsion is added to the reaction system under increasing the reaction temperature from 70° C. to 80° C. for 1 hour. Next, ⅓ by weight of reaction activators and ⅓ by weight of the initiator used in the previous reaction are added to the reaction system in order to complete the reaction. After 1 hour was followed, the ABS latex is obtained. The obtained latex comprises 34% by weight of solid, and the degree of conversion is 98%.

(3) the preparation of a ABS graft polymer by latex blending

The graft polymer obtained in the above-mentioned process (1) and (2) are mixed in the ratio of 1:1 by weight. The ratio of the amount of the small rubber particles and the large rubber particles was 18.75:81.25 by weight. This ABS latex is coagulated with diluted sulfuric acid, and then it was dehydrated and dried to obtain the ABS powder.

(4) blending process of matrix resin and ABS powder

ABS powder obtained the above-mentioned process (3) and SAN-1 copolymer compatible with ABS powder are mixed and diluted, and then it is moulded to obtain samples for measuring physical properties. The amount of rubber contained in samples is 15% by weight.

The degree of grafting and weight average molecular weight of the sample are presented in Table 1.

TABLE 1

| Examples | 1 | 2-1 and 2-2 | 3 |
|---|---|---|---|
| degree of grafting | | | |
| graft polymer containing small rubber particles | 100 | 110 | 100 |
| graft polymer containing large rubber particles | 42 | 42 | 30 |
| molecular weight (Mw) | | | |
| graft polymer containing small rubber particles | 78,00 | 76,000 | 78,000 |
| graft polymer containing large rubber particles | 104,00 | 104,000 | 91,700 |

COMPARATIVE EXAMPLE 1

(1) the preparation of the rubber latices containing small rubber particles

This process followed the procedure of the process (1) of Example 1.

(2) the preparation of the rubber latices containing large rubber particles 11764.8 kg of polybutadiene latex (31% solid by weight) are added to reactor, and then 522 kg of deionized water and 29.5 kg of potassium rosinate (solid 25% by weight) as an emulsifier are added to the reactor. After agitated, 1008 kg of styrene, 432 kg of acrylonitrile, and 10.8 kg of t-dodecyl mercaptan as a molecular weight controller are added to the reactor.

Next, other procedures, i.e., reaction temperature control and etc., follows the process (2) of Example 1. The obtained latex comprises 36.0% by weight of solid, and the degree of conversion is 96.0%.

(3) the preparation of a ABS graft palymer by latex blending

This process follows the procedure of the process(3) of Example 1.

(4) blending process of matrix resin and ABS powder

This present process follows the procedure of the process (4) of Example 1.

COMPARATIVE EXAMPLE 2-1 and 2-2

(1) the preparation of the rubber latices containing small rubber particles

This procedure follows the process (1) of Example 2, except using ½ by weight of t-dodecyl mercaptan used in the first step and the second step in order to increase the molecular weight of grafted chain.

(2) the preparation of the rubber latices containing large rubber particles

This process follows the procedure of the process(2) of Example 2.

(3) the preparation of a ABS graft palymer by latex blending

This process follows the procedure of the processes (3) and (5) of Examples 2-1 and 2-2.

(4) blending process of matrix resin and ABS powder

This process follows the procedure of the processes (4) and (6) of Examples 2-1 and 2-2.

COMPARATIVE EXAMPLE 3

(1) the preparation of the rubber latices containing small rubber particles

This process follows the procedure of the process(1) of Example 1.

(2) the preparation of the rubber latices containing large rubber particles

The composition of all of the compound used in this comparative Example is equal to Example 3. All of the monomers and other additives are added to the reactor continuously for 4 hours at 70° C.

(3) the preparation of a ABS graft polymer by latex blending

This process follows the procedure of the process(3) of Example 3.

(4) blending process of matrix resin and ABS powder

This process follows the procedure of the process(4) of Example 3.

The physical properties of comparative Examples 1~3 are presented in Table 2.

TABLE 2

| Examples | 1 | 2-1 and 2-2 | 3 |
|---|---|---|---|
| degree of grafting | | | |
| graft polymer containing small rubber particles | 100 | 140 | 100 |
| graft polymer containing large rubber particles | 38 | 50 | 48 |
| molecular weight (Mw) | | | |
| graft polymer containing small rubber particles | 78,00 | 150,000 | 78,000 |
| graft polymer containing large rubber particles | 140,00 | 100,700 | 85,700 |

The physical properties of the previous Examples 1~3 and comparative Examples 1~3 are presented in table 3.

TABLE 3

| | Examples | | | | Comparative Examples | | | |
|---|---|---|---|---|---|---|---|---|
| | 1 | 2-1 | 2-2 | 3 | 1 | 2-1 | 2-2 | 3 |
| izod notch impact strength (¼", kg cm/cm 23° C.) | 20 | 22 | 24.5 | 18 | 16 | 18 | 20 | 14 |
| melt index (g/10 min, 220° C., 10 kg) | 36 | 26 | 24 | 28 | 24 | 18 | 19 | 28 |
| surface gloss (45°) | 90 | 92 | 90 | 93 | 88 | 82 | 79 | 93 |
| tensile strength (kg/cm$^2$) | 540 | 510 | 500 | 500 | 550 | 500 | 490 | 490 |
| elongation (%) | 30 | 35 | 37 | 30 | 20.5 | 25 | 30 | 24 |
| Flexural strength (kg/cm$^2$) | 870 | 810 | 800 | 800 | 890 | 800 | 790 | 810 |
| Flexural modulus (kg/cm$^2$) | 26600 | 25000 | 24700 | 25200 | 26400 | 25000 | 25000 | 25000 |
| hardness (R-scale) | 110 | 108 | 108 | 108 | 110 | 108 | 109 | 108 |

TABLE 3-continued

| | Examples | | | | Comparative Examples | | | |
|---|---|---|---|---|---|---|---|---|
| | 1 | 2-1 | 2-2 | 3 | 1 | 2-1 | 2-2 | 3 |
| rubber content (%) | 13.5 | 15 | 15 | 15 | 13.5 | 15 | 15 | 15 |
| weight ratio of large rubber particles/ small rubber particles | 88.89/ 11.11 | 85.7/ 14.3 | 90/ 10 | 81.25/ 18.75 | 88.89/ 11.11 | 85.7/ 14.3 | 90/ 10 | 81.25/ 18.75 |

Even though the gel content of the rubber is very high in the graft polymerization using the polymer latices differing in rubber particle diameters, the impact strength and surface gloss are much varied according to the ratio of rubbers and monomers as shown tables 1~3.

COMPARATIVE EXAMPLE 4

(1) the preparation of the rubber latices containing small rubber particles

This procedure of the process (1) of Example 1, except using 0.5 parts by weight of molecular weight controller per 100 parts by weight of monomer.

(2) the preparation of the rubber latices containing large rubber particles

This process follows the procedure of the process(2) of Example 1.

(3) the preparation of a ABS graft palymer by latex blending

This process follows the procedure of the process(3) of Example 1.

(4) blending of matrix resin and ABS powder

This process follows the procedure of the process(4) of Example 1. The sample for measuring physical properties is obtained.

COMPARATIVE EXAMPLE 5

(1) the preparation of the rubber latices containing small rubber particles

This process follows the procedure of the process(1) of Example 1.

(2) the preparation of the rubber latices containing large rubber particles

This procedure follows of the process (2) of Example 1, except using 0.3 parts by weight of molecular weight controller per 100 parts by weight of monomer.

The degree of conversion is 98%.

(3) the preparation of a ABS graft palymer by latex blending

This process follows the procedure of the process(3) of Example 1.

(4) blending of matrix resin and ABS powder

This process follows the procedure of the process(4) of Example 1. The sample for measuring physical properties is obtained.

The degree of grafting and weight average molecular weight of comparative Examples 4~5 are presented in Table 4.

TABLE 4

| Comparative Examples | 4 | 5 |
|---|---|---|
| degree of grafting | | |

TABLE 4-continued

| Comparative Examples | 4 | 5 |
|---|---|---|
| graft polymer containing small rubber particles | 140 | 100 |
| graft polymer containing large rubber particles | 42 | 55 |
| molecular weight (Mw) | | |
| graft polymer containing small rubber particles | 140,000 | 78,000 |
| graft polymer containing large rubber particles | 170,000 | 238,000 |

Also, the physical properties of Comparative Examples 4~5 are presented in Table 5.

TABLE 5

| Comparative Examples | 4 | 5 |
|---|---|---|
| izod notch impact strength ($\frac{1}{4}$", kg cm/cm) | 21 | 15 |
| melt index (g/10 min, 220° C. 10 kg) | 15 | 18 |
| surface gloss (%) | 80 | 88 |
| tensile strength (kg/cm$^2$) | 550 | 540 |
| elongation (%) | 28 | 32 |
| flexural strength (kg/cm$^2$) | 880 | 870 |
| flexural modulus (kg/cm$^2$) | 27000 | 26000 |
| hardness (R-scale) | 108 | 107 |

If the molecular weight and the degree of grafting of small rubber particles are increased, impact strength is excellent but flow and surface gloss are poor. Also, if the degree of grafting of the graft polymer containing large rubber particles is above 50% and the molecular weight is high, the impact strength and the surface gloss are not improved.

Accordingly, when a thermoplastic resin is produced by using rubber latex having more than 90% by weight of gel content, the degree of grafting preferably 60 to 120% in the case that the monomer is grafted onto the rubber latex having 0.07 to 0.15 μm of particle diameter. The weight average molecular weight of the grafted chain is preferably 40,000 to 120,000. Also, the degree of grafting is preferably 25 to 45%, and the weight average molecular weight of the grafted chain is desirably 60,000 to 120,000 in case of using rubber latex having large rubber particle diameter of 0.25 to 1.0 μm.

What is claimed is:

1. A process for the preparation of impact resistance high gloss thermoplastic resin which comprises blending graft polymer latex (A) and graft polymer latex (B),
wherein said graft latex (A) has a weight average molecular weight, Mw, of 40,000 to 120,000 and a degree of grafting of 60 to 120% and is produced by grafting monomers onto 10 to 40 parts by weight of rubber latices containing small particles consisting of particles having an average particle diameter of 0.03 to 0.2 μm and a gel content of 70 to 95% by weight, and
wherein said graft polymer latex (B) has a weight average molecular weight, Mw, of 40,000 to 120,000 and a degree of grafting of 25 to 45% and is produced by grafting monomers onto 40 to 80 parts by weight of rubber latices containing large rubber particles consisting of particles having an average particle diameter of 0.25 to 1.0 μm, and wherein said small rubber particles and said large rubber particles are comprised of polybutadiene or a copolymer which contains more than 50% by weight of butadiene.

2. The process according to claim 1, wherein said monomers are selected from the group consisting of vinyl aromatic compounds and vinyl compounds.

3. The process according to claim 1, wherein a molecular weight controller is present during the grafting reaction to make the graft polymer latex (B) in an amount of 0.6 to 1.2 parts by weight per 100 parts by weight of monomers.

4. The process according to claim 1, wherein the reaction of grafting the monomers onto the rubber latex containing large rubber particles is carried out by adding continuously the whole quantity of the monomers to the rubber latex containing large rubber particles, or after adding a portion of the monomers batchwise, adding the remaining monomers continuously to the rubber latex containing large rubber particles.

5. The process according to claim 4, wherein said reaction of grafting the monomers is carried out by adding 50 to 80% by weight of the mixture of monomers at 42° to 70° C. for 3 hours, and then adding 20 to 50% by weight of the mixture of monomers at 70° to 80° C. for 1.5 hours.

6. The process according to claim 4, wherein the reaction of grafting the monomers comprises adding batchwise a portion of the monomers in a ratio of monomers to rubber latex containing large rubber particles of 0.16 to 0.35 by weight, and wherein the reaction temperature is 42° to 62° C. below 65% of the degree of conversion and the reaction temperature is 68° C. above 65% of the degree of conversion.

7. The process according to claim 6, wherein case that the remaining monomers are added continuously to said grafting reaction for 3 hours at 68° to 80° C.

8. The process according to claim 1, wherein the ratio of large rubber particles to small rubber particles contained in the produced thermoplastic resin is 95:5 to 70:30 by weight.

9. The process according to claim 1, wherein the thermoplastic resin contains 30 to 55% by weight of rubber.

10. The process according to claim 2, wherein said monomers are added in a ratio of vinyl aromatic compounds to vinyl compounds of 60:40 to 100:0.

11. The process according to claim 1, wherein said rubber latex containing large particles has a gel content of 85 to 95% by weight.

12. The process according to claim 1, wherein said molecular weight, Mw, for said graft polymer latex (A) is 50,000 to 100,000.

13. The process according to claim 1, wherein said molecular weight, Mw, for said graft polymer latex (A) is 45,000 to 100,000.

14. A thermoplastic resin produced according to the process of claim 1.

* * * * *